United States Patent
Yang et al.

(10) Patent No.: US 8,407,188 B1
(45) Date of Patent: Mar. 26, 2013

(54) METHODS AND SYSTEMS FOR PROVIDING DATA FORM MANAGEMENT

(75) Inventors: Tao Yang, The Colony, TX (US); Amit Singh, Irving, TX (US); Fariborz Ebrahimi, Arlington, VA (US); Edy Setaiwan, Irving, TX (US)

(73) Assignee: Verizon Data Services LLC, Basking Ridge, NJ (US)

( * ) Notice: Subject to any disclaimer, the term of this patent is extended or adjusted under 35 U.S.C. 154(b) by 1008 days.

(21) Appl. No.: 10/898,111

(22) Filed: Jul. 23, 2004

Related U.S. Application Data

(60) Provisional application No. 60/489,988, filed on Jul. 25, 2003.

(51) Int. Cl.
| G06F 7/00 | (2006.01) |
| G06F 17/00 | (2006.01) |
| G06F 17/20 | (2006.01) |
| G06F 17/21 | (2006.01) |
| G06F 17/22 | (2006.01) |
| G06F 17/24 | (2006.01) |
| G06F 17/25 | (2006.01) |
| G06F 17/26 | (2006.01) |
| G06F 17/27 | (2006.01) |
| G06F 17/28 | (2006.01) |

(52) U.S. Cl. ........................ 707/690; 715/222
(58) Field of Classification Search ............... 715/762, 715/764, 788, 222; 707/610, 690
See application file for complete search history.

(56) References Cited

U.S. PATENT DOCUMENTS

| 5,428,694 A * | 6/1995 | Betts et al. ........... 382/317 |
| 5,704,029 A | 12/1997 | Wright |
| 5,809,497 A * | 9/1998 | Freund et al. ......... 707/2 |
| 5,911,143 A | 6/1999 | Deinhart et al. |
| 6,161,139 A | 12/2000 | Win et al. |
| 6,223,184 B1 * | 4/2001 | Blackman et al. ...... 707/103 R |
| 6,289,333 B1 | 9/2001 | Jawahar et al. |
| 6,308,173 B1 | 10/2001 | Glasser et al. |
| 6,314,415 B1 * | 11/2001 | Mukherjee ............ 706/47 |
| 6,380,954 B1 | 4/2002 | Gunther |
| 6,430,571 B1 * | 8/2002 | Doan et al. ........... 707/103 R |
| 6,460,141 B1 | 10/2002 | Olden |
| 6,473,769 B1 * | 10/2002 | Andrew et al. ........ 707/610 |
| 6,535,883 B1 | 3/2003 | Lee et al. |
| 6,662,231 B1 | 12/2003 | Drosset et al. |
| 6,816,906 B1 | 11/2004 | Icken et al. |
| 6,931,402 B1 | 8/2005 | Pereira |
| 6,976,078 B1 | 12/2005 | Icken et al. |
| 6,985,953 B1 | 1/2006 | Sandhu et al. |
| 7,010,760 B2 | 3/2006 | Arnstein et al. |
| 7,089,319 B2 | 8/2006 | Lysenko et al. |

(Continued)

OTHER PUBLICATIONS

"Index of/candan/papers" [http:/aria.asu.edu/candan/papers], downloaded on Oct. 2, 2007.

(Continued)

*Primary Examiner* — Apu Mofiz
*Assistant Examiner* — Jared Bibbee

(57) ABSTRACT

Providing data form management may comprise receiving form definition data, transforming the form definition data into an internal data structure, and storing the internal data structure in a form definition data table. In addition, providing data form management may comprise creating a form input data table corresponding to the form definition data table and notifying a form datastore that caches the internal data structure stored in the form definition data table. Furthermore, receiving the form definition data may further comprise providing a data page including at least one form component being user arrangeable on the data page and providing the ability to move, add, or delete at least one form component on the data page. The form definition data may define one of the form component or the location of the form component on the data page.

21 Claims, 4 Drawing Sheets

U.S. PATENT DOCUMENTS

| | | | |
|---|---|---|---|
| 7,117,504 B2 | 10/2006 | Smith et al. | |
| 7,185,044 B2 | 2/2007 | Ryan et al. | |
| 7,240,360 B1 | 7/2007 | Phan | |
| 7,246,320 B2 | 7/2007 | Foucher et al. | |
| 7,404,140 B2* | 7/2008 | O'Rourke | 715/222 |
| 7,899,867 B1 | 3/2011 | Sherstinsky et al. | |
| 2001/0054064 A1 | 12/2001 | Kannan | |
| 2002/0032596 A1 | 3/2002 | Ohsaki et al. | |
| 2002/0040352 A1 | 4/2002 | McCormick | |
| 2002/0087383 A1 | 7/2002 | Cogger et al. | |
| 2002/0147743 A1* | 10/2002 | Le et al. | 707/505 |
| 2002/0180789 A1 | 12/2002 | Guttmann et al. | |
| 2003/0018725 A1 | 1/2003 | Turner et al. | |
| 2003/0036940 A1 | 2/2003 | Leymann et al. | |
| 2003/0084401 A1 | 5/2003 | Abel et al. | |
| 2003/0110443 A1 | 6/2003 | Yankovich et al. | |
| 2003/0233296 A1* | 12/2003 | Wagner | 705/31 |
| 2004/0010502 A1 | 1/2004 | Bomfim et al. | |
| 2004/0064783 A1* | 4/2004 | Braun et al. | 715/500 |
| 2004/0078105 A1 | 4/2004 | Moon et al. | |
| 2004/0078446 A1 | 4/2004 | Daniell et al. | |
| 2004/0083426 A1* | 4/2004 | Sahu | 715/505 |
| 2004/0181513 A1 | 9/2004 | Henderson et al. | |
| 2004/0205529 A1* | 10/2004 | Poulose et al. | 715/506 |
| 2004/0236655 A1 | 11/2004 | Scumniotales et al. | |
| 2004/0255252 A1 | 12/2004 | Rodriguez et al. | |
| 2005/0005259 A1 | 1/2005 | Avery et al. | |
| 2005/0010547 A1 | 1/2005 | Carinci et al. | |
| 2005/0060167 A1 | 3/2005 | Patron et al. | |
| 2005/0187781 A1 | 8/2005 | Christensen | |
| 2005/0235034 A1 | 10/2005 | Chen et al. | |
| 2005/0257045 A1 | 11/2005 | Bushman et al. | |
| 2006/0080130 A1 | 4/2006 | Choksi et al. | |
| 2006/0101098 A1 | 5/2006 | Morgan et al. | |
| 2006/0101119 A1 | 5/2006 | Qureshi et al. | |
| 2007/0016641 A1 | 1/2007 | Broomhall | |
| 2007/0214001 A1 | 9/2007 | Patron et al. | |
| 2008/0086564 A1 | 4/2008 | Putman et al. | |
| 2008/0126988 A1 | 5/2008 | Mudaliar | |
| 2008/0127032 A1 | 5/2008 | Mital et al. | |

OTHER PUBLICATIONS

IPSwitch Instant Messaging; Instant Messaging as a Business Tool; Retrieved from the www.waybackmachine.org of site www.ipswitch.net, Available online Dec. 7, 2004, pp. 1-6.

K. Candan and W. Li, "Integration of Database and Internet Technologies for Scalable End-to-end E-commerce Systems" [http:/aria.asu.edu/candan/papers/06chap.pdfj, Idea Group Publishing, 2003, pp. 84-112.

Stokes, "Implementing online chat in a Web Portal", www.ibm.com/developerworks/ibm/libraryi-portalchat/.

\* cited by examiner

METHODS AND SYSTEMS FOR PROVIDING DATA FORM MANAGEMENT

CROSS REFERENCE TO RELATED APPLICATIONS

This application claims the benefit of U.S. Provisional Patent Application Ser. No. 60/489,988, filed Jul. 25, 2003, the disclosure of which is expressly incorporated herein by reference.

U.S. patent application Ser. No. 10/898,110, filed on even date herewith in the name of Amit Singh et al. and entitled METHODS AND SYSTEMS FOR PROVIDING CAPABILITY MANAGEMENT AND USER ADMINISTRATION and U.S. patent application Ser. No. 10/897,744, filed on even date herewith in the name of Amit Singh et al. and entitled METHODS AND SYSTEMS FOR PROVIDING A DATA ACCESS LAYER, both assigned to the assignee of the present application, the disclosures of which are expressly incorporated herein by reference.

BACKGROUND INFORMATION

Each of the past three centuries has been dominated by a single technology. The eighteenth century included great mechanical systems ushering in the industrial revolution. The nineteenth century saw the steam engine's development. During the twentieth century, the key technology was information gathering, processing, and distribution. Other developments include worldwide telephone networks, radio and television, the birth and unprecedented growth in the computer industry, and communication satellites.

At the beginning of the twenty-first century, these areas are rapidly converging, and the differences between collecting, transporting, storing, and processing information are quickly disappearing. For example, enterprises with hundreds of offices spread over a wide geographical area routinely expect to inspect the current status of even their most remote office at the push of a button. As capabilities to gather, process, and distribute information grow, the demand for even more sophisticated information processing grows faster.

As a result of these advancing technologies, large electronic commerce (e-commerce) applications have been developed, for example, using the Internet. Many e-commerce applications accept customer input using hypertext markup language (HTML) forms and store the input data into a database for later retrieval and processing. Substantial development effort could be required for developing the HTML form, the associated data validation, and code for the storage and retrieval of data. In some situations, the business owner of the application also wants the ability to change the format or data validation of the HTML form on a production system directly, rather than having a development team revise code or web pages, and then deploy the changes to the production system after testing.

Although many form design software applications are available to help developers design HTML forms, none are netweb-based, and thus may not be used by the customer directly from a browser. For example, prior systems require some custom application to be installed on a user/developer's computer desktop. After a developer designs an HTML form, the form may need to be deployed to production through the traditional change deployment process. Moreover, prior systems lack direct integration with a database. For example, prior systems only create the HTML form, for example, while the developer may need to design the associated database schema and write code for database storage and retrieval of the data entered in the created form.

Thus, there is a need for improved systems and methods for providing data form management. For instance, there is a need to provide data form creation and modification over a network. Furthermore, there is a need for such improved systems and methods to directly integrate with databases.

SUMMARY

In accordance with the current invention, data form management method and system are provided that avoid the problems associated with prior data form management methods and systems as discussed herein above.

In one embodiment according to the present invention, a method for providing data form management comprises receiving form definition data, transforming the form definition data into an internal data structure, storing the internal data structure in a form definition data table, creating a form input data table corresponding to the form definition data table, and notifying a form datastore that caches the internal data structure stored in the form definition data table.

In another embodiment according to the present invention, a system for providing data form management comprises a component for receiving form definition data, a component for transforming the form definition data into an internal data structure, a component for storing the internal data structure in a form definition data table, a component for creating a form input data table corresponding to the form definition data table, and a component for notifying a form datastore that caches the internal data structure stored in the form definition data table.

In yet another embodiment according to the present invention, a computer-readable medium on which is stored a set of instructions for providing data form management, which when executed perform stages comprising receiving form definition data, transforming the form definition data into an internal data structure, storing the internal data structure in a form definition data table, creating a form input data table corresponding to the form definition data table, and notifying a form datastore that caches the internal data structure stored in the form definition data table.

Both the foregoing general description and the following detailed description are exemplary and are intended to provide further explanation of the invention as claimed.

DETAILED DESCRIPTION OF PREFERRED EMBODIMENTS

Figure 1:
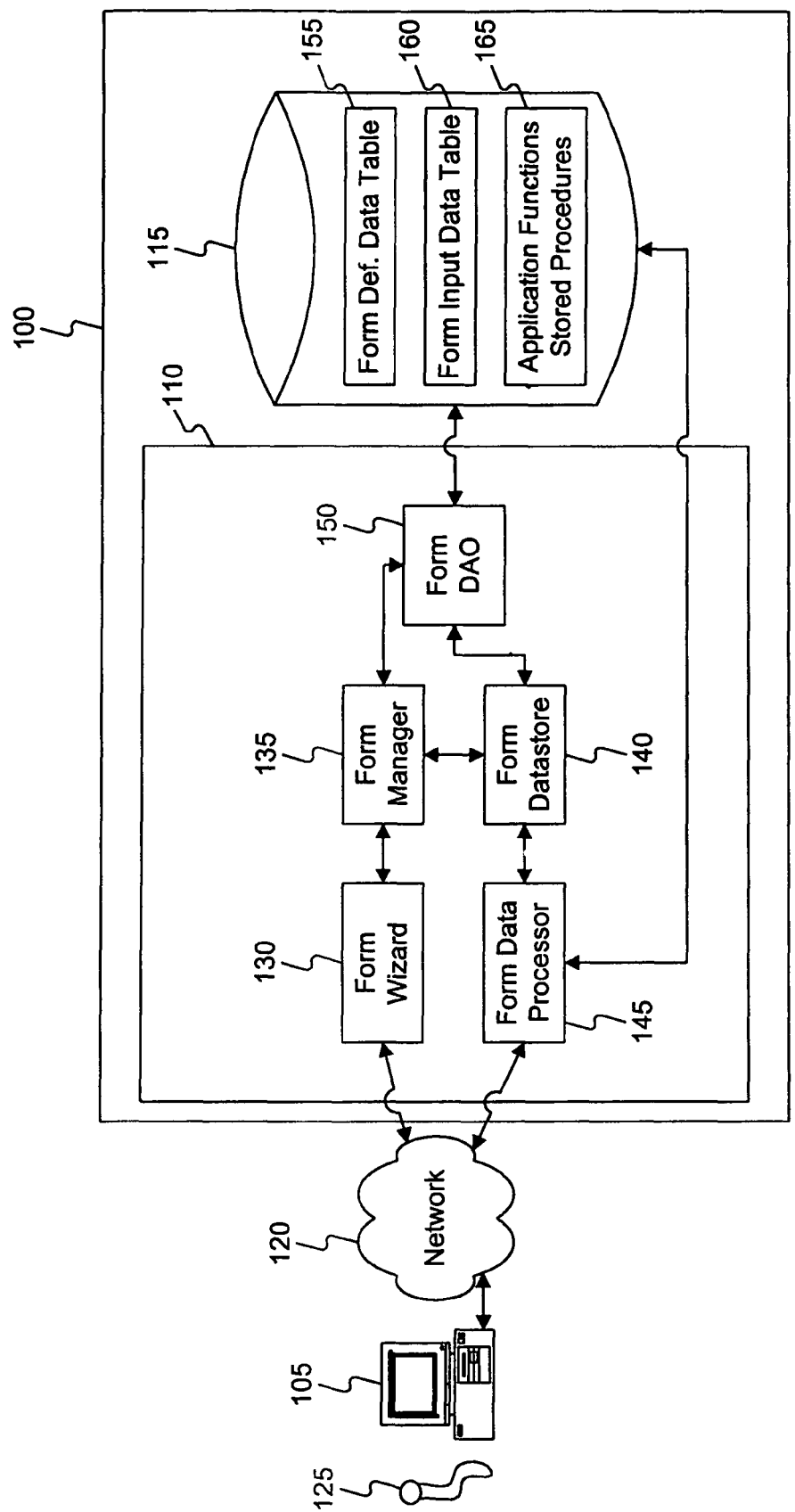
FIG. 1 is a functional block diagram of an exemplary system for providing data form management consistent with an embodiment of the present invention.

Reference will now be made to various embodiments according to this invention, examples of which are shown in the accompanying drawings and described below. In the drawings, the same reference numbers represent the same or similar elements in the different drawings whenever possible.

Figure 3:
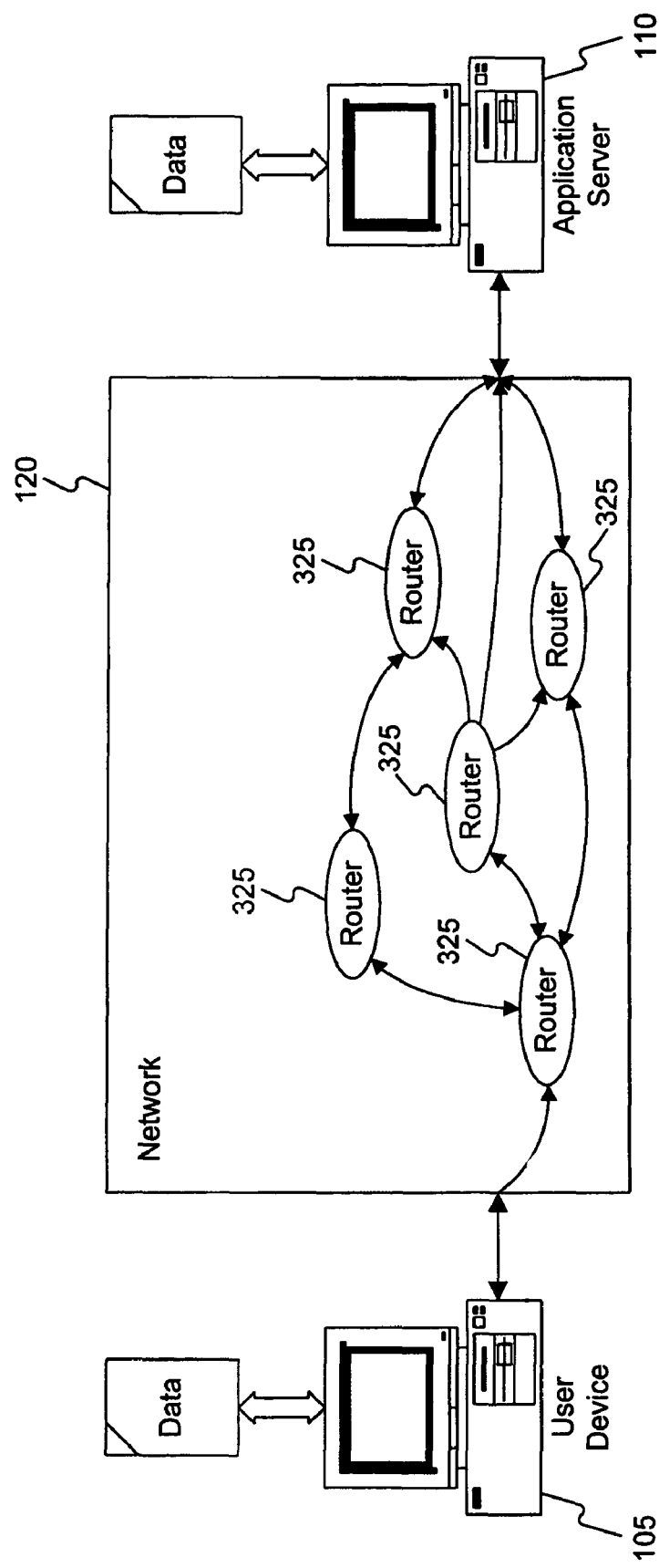
FIG. 3 is a functional block diagram of an exemplary network consistent with an embodiment of the present invention.
Figure 4:
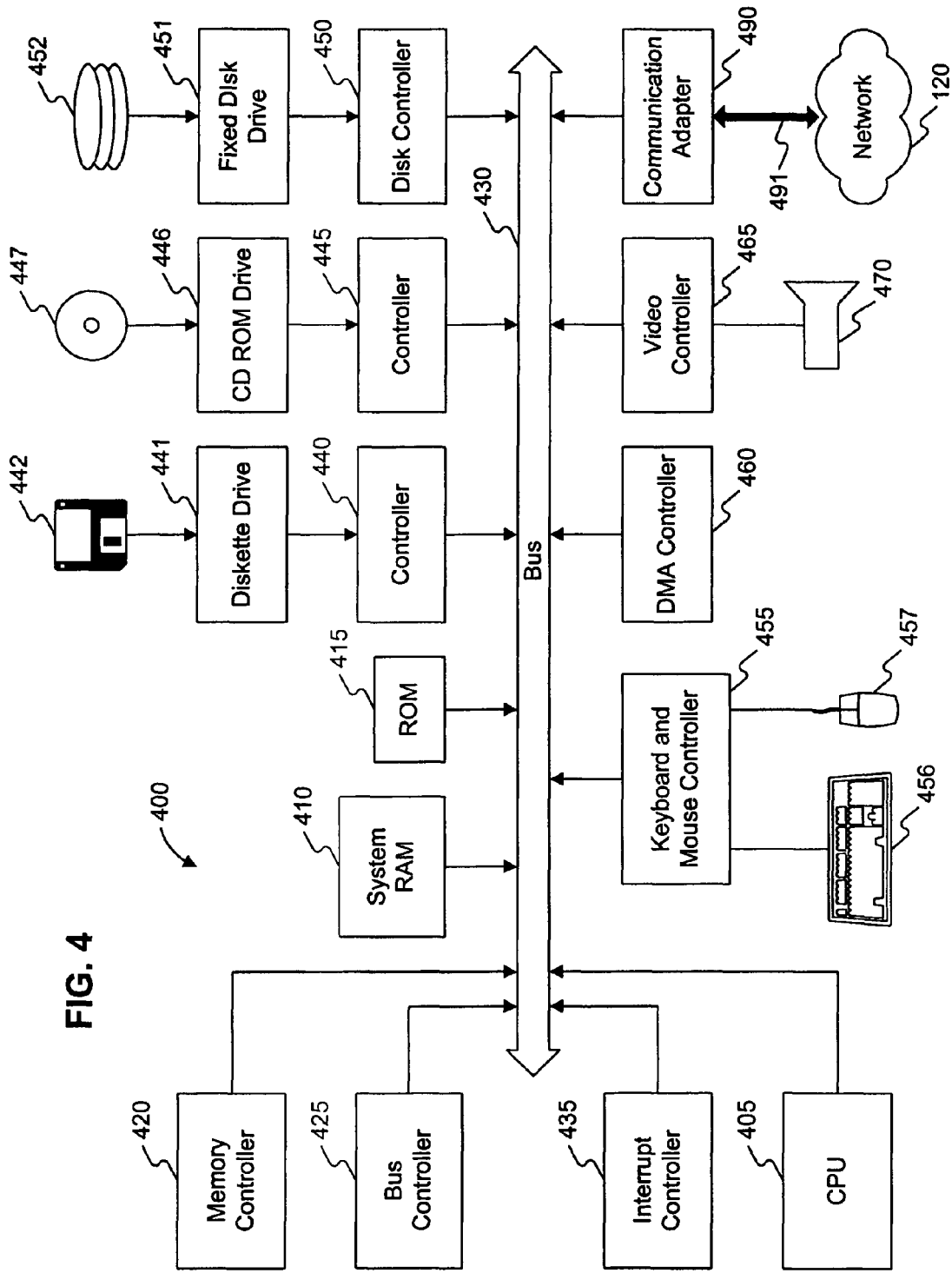
FIG. 4 is a functional block diagram of an exemplary computer system consistent with an embodiment of the present invention.

Consistent with an exemplary embodiment of the present invention, a system for providing data form management may comprise a component for receiving form definition data, a component for transforming the form definition data into an internal data structure, a component for storing the internal data structure in a form definition data table, a component for creating a form input data table, and a component for notifying a form datastore. Consistent with an exemplary embodiment of the present invention, the aforementioned components may comprise, be disposed, or implemented within an application server 110, as shown in FIGS. 1, 3, and 4, as described below. Application server 110 is exemplary and other devices and systems may comprise the aforementioned components and still be consistent with embodiments of the present invention.

As herein embodied and illustrated in FIG. 1, elements of a data form management system 100 may comprise a user device 105, application server 110, a database server 115, and a network 120. User device 105 or application server 110 may comprise a personal computer or other similar microcomputer-based workstation as described below with respect to FIG. 4, for example. However, user device 105 or application server 110 may comprise any type of computer operating environment such as hand-held devices, multiprocessor systems, microprocessor-based or programmable sender electronics, minicomputers, mainframe computers, and the like. User device 105 or application server 110 may also be practiced in distributed computing environments where tasks are performed by remote processing devices. Furthermore, user device 105 or application server 110 may comprise a mobile terminal such as a smart phone, a cellular telephone, a cellular telephone utilizing wireless application protocol (WAP), personal digital assistant (PDA), intelligent pager, portable computer, a hand held computer, a conventional telephone, or a facsimile machine. The aforementioned systems and devices are exemplary and user device 105 or application server 110 may comprise other systems or devices.

A PDA is a handheld computer that serves as an organizer for personal information. It generally includes at least a name and address database, to-do list and note taker. PDAs are typically pen-based and use a stylus ("pen") to tap selections on menus and to enter printed characters. The unit may also include a small on-screen keyboard which is tapped with the pen. Data may be synchronized between the PDA and a desktop computer through a cable or wireless transmissions.

WAP is a standard for providing cellular phones, pagers and other handheld devices with secure access to e-mail and text-based Web pages. It provides a complete environment for wireless applications that includes a wireless counterpart of TCP/IP and a framework for telephony integration such as call control and phone book access. Wireless Markup Language (WML), which is a streamlined version of HTML for small screen displays, is featured in WAP. WAP uses WML-Script, a compact language that runs in limited memory, and supports handheld input methods such as keypads and voice recognition. In addition, WAP is independent of the air interface and runs over all the major wireless networks. Moreover, it is also device independent, requiring only a minimum functionality in the unit so that it can be used with many different phones and handheld devices.

User device 105 or application server 110 may be located in a home, an office, a store, a retail center kiosk, or any location wherein it may be operated. Moreover, user device 105 may be operated by user 125 that may comprise a subject, a software developer, a technician, a technical advisor, or any other person. It can be appreciated that user device 105 may be located at a variety of places and operated by a variety of people.

Network 120 may comprise, for example, a local area network (LAN) or a wide area network (WAN). Such networking environments are commonplace in offices, enterprise-wide computer networks, intranets, and the Internet, which is described below with respect to FIG. 4, for example. When a LAN is used as network 120, user device 105 or application server 110 may be connected to network 120 through a network interface located at each of the respective user device 105 and elements of application server 110. When a WAN networking environment is utilized as network 120, user device 105 and elements of application server 110 typically include an internal or external modem (not shown) or other means for establishing communications over the WAN, such as the Internet.

In addition to utilizing a wire line communications system as network 120, a wireless communications system, or a combination of wire line and wireless may be utilized as network 120 in order to, for example, exchange web pages via the internet, exchange e-mails via the Internet, or for utilizing other communications channels. Wireless can be defined as radio transmission via the airwaves, however, those skilled in the art will appreciate that various other communication techniques can be used to provide wireless transmission including infrared line of sight, cellular, microwave, satellite, packet radio and spread spectrum radio. User device 105 and elements of application server 110 in the wireless environment can be any mobile terminal such as a cellular phone, personal digital assistant (PDA), intelligent pager, portable computer, hand held computer, or any device capable of receiving wireless data. Wireless data may include, but is not limited to, paging, text messaging, e-mail, Internet access and other specialized data applications specifically excluding or including voice transmission.

In system 100, data may be transmitted by methods and processes other than, or in combination with communication system 120. These methods and processes may include, but are not limited to, transferring data via diskette, CD ROM, facsimile, conventional mail, an interactive voice response system (IVR), or via voice over a publicly switched telephone network. An IVR is an automated telephone answering system that responds with a voice menu and allows the user to make choices and enter information via the telephone keypad. IVR systems are widely used in call centers as well as a replacement for human switchboard operators. An IVR system may also integrate database access and fax response.

As shown in FIG. 1, system 100 may comprise form wizard 130, form manager 135, form datastore 140, form data processor 145, form data access object (DAO) 150. Database server 115 may comprise form definition data tables 155, form input data tables 160, and application functions and stored procedures 165. Form wizard 130 may comprise the aforementioned component for receiving form definition data. Form manager 135 may comprise the aforementioned component for transforming the form definition data into an internal data structure and the aforementioned component for notifying a form datastore. In addition, form DAO 150 may comprise the aforementioned component for storing the internal data structure in a form definition data table and the aforementioned component for creating a form input data table.

System 100 may be completely network-based (internet-based for example) enabling user 125 to define HTML data forms, for example, with automatically created database schema for the data form once the form is created. The data form may immediately become available for a customer, for example, to use for data entry, storage, and retrieval. In addition, system 100 may enable user 125 to define the behavior of forms based on business rules and to define table structures with the ability to add, edit, copy, and delete table rows, for example.

As described in greater detail below, two types of data related to a data form may be used. One type is form definition data that may provide information about form components and the attributes and layout of the form. Another other type of data is form input data that may be entered by a customer, for example, and captured in the form when it is displayed to the customer.

Form wizard 130 may provide, for example, a front-end interface to user device 105. Form manager 135 may comprise a backend component that may control the creating and updating of data forms. Form manager 135 may transform form definition data, which may define the definition of a form entered by a user for example, into an internal data structure. Form manager 135 may pass the internal data structure to form DAO 150 that may update form definition data tables 155. Form datastore 140 may maintain the cache for form definitions. When the application server 110 starts up, the form definitions may be loaded into form datastore 140 through form DAO 150 from database server 115. Later, form datastore 140 may return information to form wizard 130 and other components when they request form definition information without querying database server 115 again. When a form is updated, form manager 135 may inform form datastore 140 about the update so that the form definitions in the form definition data tables 155 and the cache are consistent.

Form DAO 150 may also update database schema for holding form input data whenever a form is created or updated. Once a form is created and its corresponding database schema is established, form data processor 145 may display the form on a browser for data entry. The browser may be located on user device 105 or any other device connected to network 120 that can communicate with application server 110. With the data entered through the browser, stored procedures 165 may direct the application server 110 to store the form input data into form input data table 160 and also restore the form input data later on the browser.

Figure 2:
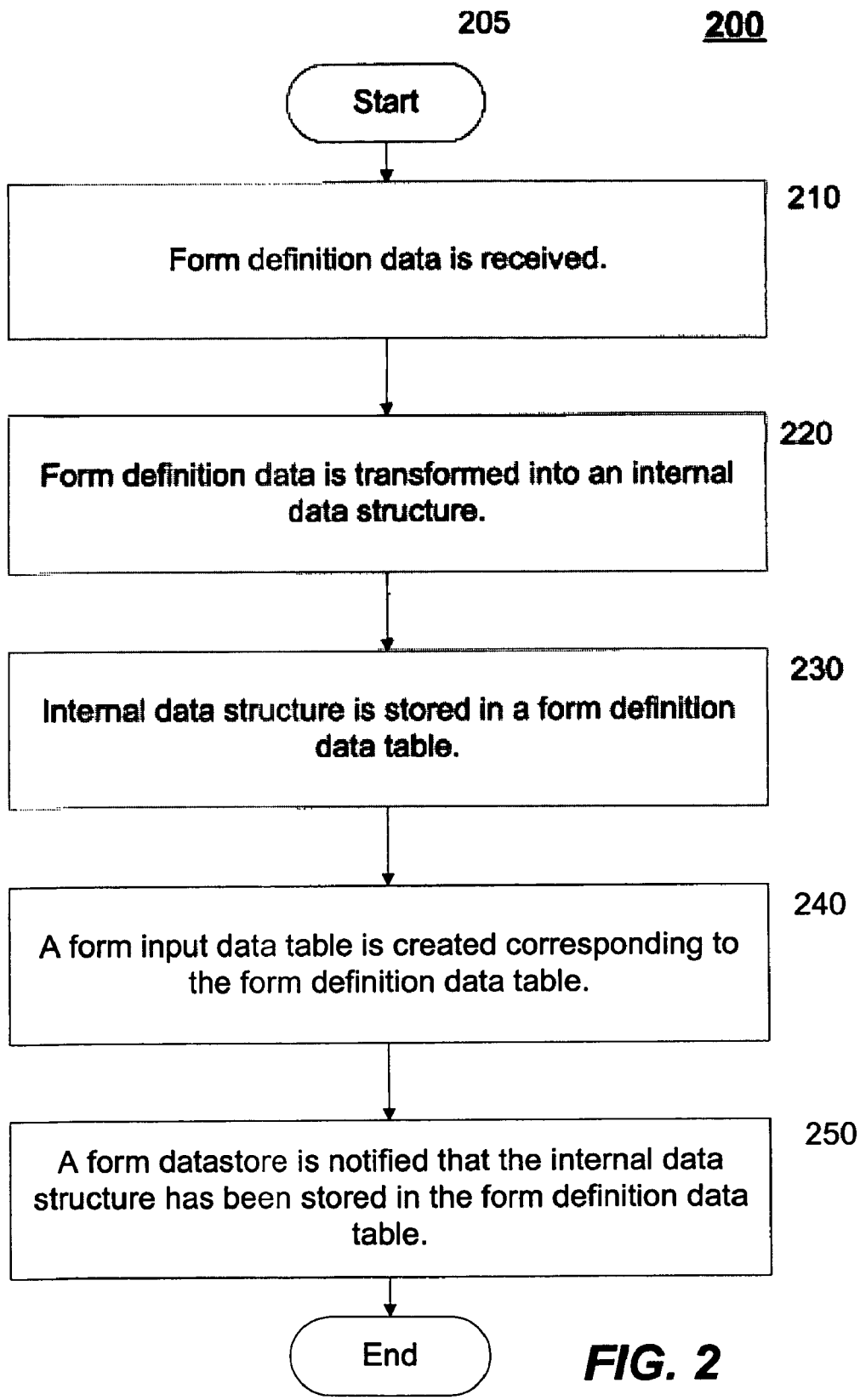
FIG. 2 is a flow chart of an exemplary method providing data form management consistent with another embodiment of the present invention.

FIG. 2 is a flow chart setting forth the general stages involved in exemplary method 200 for providing data form management. The implementation of the stages of exemplary method 200 in accordance with an exemplary embodiment of the present invention will be described in greater detail below. Exemplary method 200 begins at starting block 205 and proceeds to exemplary subroutine 210 where form definition data is received. Specifically, user 125 may access form wizard 130 and completely create a data form from a browser. Form wizard 130 may pass all the form definition data to form manager 135. For example, the form definition data may comprise a form name or a form attribute and may define a text box or a radio button. Further, the form attribute may comprise a database persistence.

The form definition data may define the form component or the location of the form component on the data page. For example, from a browser, form wizard 130 may be accessed through network 105. As displayed to user 125 on the browser, user 125 can define form components and the layout of the form using a drag-and-drop feature with a computer mouse, for example. Form wizard can display form components in the browser window using hypertext markup language (HTML) for example. User 125 may move the components around with mouse until they form the desired layout, also using HTML. In this manner, an experienced user with appropriate access privileges, not just software developers, can create/update data forms quickly and efficiently.

In addition, the form definition data may define a table structure representing an editable list in a form. The table may have buttons for the user to add, edit, copy, or delete a row in this table when the form is presented to the user 125 for data entry after the form is defined. For example, an invoice form may contain a list of products to be purchased along with their price and quantity. Form wizard 130 may be able to define such an invoice form containing a table structure representing the product list. When this invoice form is represented to the user 125 for data entry after it is defined, the user 125 may add, edit, copy, or delete products in the product list of this invoice.

Furthermore, the form definition data may define a binder configured to group a set of form components as hidden or unhidden as a group. For example, user 125 may communicate form definition data to form wizard 130 through user device 105. The form definition data may define form components comprising, for example, a group of individual fields to receive a group of individual data elements. User 125 may wish to define a first condition in which the group of individual data elements are needed and a second condition in which the group of individual data elements are not needed. Furthermore, if the second condition is true, user 125 may wish for the group of individual fields not to appear (or to be hidden) on the data form. Accordingly, the form definition data may define a binder that causes a set of form components to be hidden or unhidden as a group on the data form according to a condition.

Moreover, the form definition data may comprise a rule defining that a field be set as required, a field be set as hidden, a field be set as read-only, or a field be set equal to a calculated value under a condition.

From stage 210 where form definition data is received, exemplary method 200 advances to stage 220 where form definition data is transformed into an internal data structure. For example, form manager 135 may process the form definition data from form wizard 130, transform the form definition data into an internal data structure, and then pass the internal data structure to form DAO 150.

Once form definition data is transformed into the internal data structure in stage 220, exemplary method 200 continues to stage 230 where the internal data structure is stored in form definition data table 155. For example, form DAO 150 may access database server 115 and store the internal data structure corresponding to the form definition data in form definition data table 155.

After the internal data structure is stored in the form definition data table in stage 230, exemplary method 200 proceeds to stage 240 where a form input data table is created corresponding to the form definition data table. For example, form DAO 150 may create the form input data table using a relational database management system software. Database management system (DBMS) software controls the organization, storage, retrieval, security and integrity of data in a database. It may accept requests from an application and instruct the operating system to transfer the appropriate data.

Using a DBMS lets information systems be changed more easily as an enterprise's requirements change. New categories of data can be added to the database without disruption to the existing system. Adding a field to a record may not require changing any of the programs that do not use the data in that new field. Moreover, with a DBMS, the details of the data structure may not be stated in each application program. The application program may ask the DBMS for data by field name; for example, a coded equivalent of "give me customer name and balance due" would be sent to the DBMS. Without a DBMS, a programmer may need to reserve space for the full structure of the record in the program and any change in data structure may require changing all application programs.

After the internal data structure is stored in the form definition data table in stage 230, exemplary method 200 proceeds to stage 240 where a form input data table is created corresponding to the form definition data table. For example, form DAO 150 may create the form input data table using a relational database management system software. Database management system (DBMS) software controls the organization, storage, retrieval, security, and integrity of data in a database. It may accept requests from an application and instruct the operating system to transfer the appropriate data.

Consistent with an embodiment of the invention, after a data from has been created, a customer may request data entry using the new form. In this case, form data processor 145 may retrieve the form definition information from form datastore 140 and then construct a display of the empty form on a browser for data entry. Once displayed on the browser, the customer may fill out the form and click a submit button, for example. Form data processor 145 may receive the form input data passed in the data form. Next, form data processor 145 may pass the form input data to database server 115 that stores the data.

As herein embodied and illustrated in FIG. 3, network 120 may comprise, but is not limited to, the Internet. Basically, the Internet is an association of networks including millions of computers across the world that all work together to share information. On the Internet, the main lines that carry the bulk of the traffic and are collectively called the Internet backbone. The Internet backbone is formed by the biggest networks in the system, owned by major Internet service providers (ISPs). By being connected together, these networks create a fast data pipeline that crosses the United States and extends to Europe, Japan, Asia, and the rest of the world.

In the United States, there are five points where main lines comprising the Internet backbone intersect. These intersections are called network access points (NAPs) and are located in San Francisco, San Jose (Calif.), Chicago, New York, Pennsauken, N.J., and Washington, D.C. Located at the NAPs is high-speed networking equipment used to connect the Internet backbone to additional networks. These additional networks may be owned by smaller regional and local ISPs, which in turn may lease access to enterprises or persons in the areas they serve.

In exchanging information over the Internet, computers connected to the Internet may use a network protocol called transmission control protocol (TCP) and Internet protocol (IP), collectively referred to as "TCP/IP". In general, TCP/IP creates a network, known as a "packet-switched network" intended to minimize the chance of losing any data that is sent over the network. In doing so, TCP is used to break down the data to be sent over the network into small pieces called "packets" and wraps each packet in an electronic envelope with an address of both user device 105 and application server 110, for example. Next in exchanging over the Internet, IP is used to determine how the data should move from user device 105 to application server 110, for example, by passing through a series of routers 325 located in network 120. Each router 325 examines a packet's address and then passes it to another router 325 in network 120 until the packet converges on application server 110. Once application server 110 has received all the packets, TCP is used at application server 110 to reassemble them into the data.

The data sent may comprise an Internet web page, for example, written in Hypertext Markup Language (HTML). The data in HTML format may be used by a program, referred to as a web browser, on application server 110 that displays the web page described in the data. HTML uses tags (codes) embedded in the data that may define the page layout, fonts, and graphic elements as well as the hypertext links to other documents on the Internet.

As herein embodied and illustrated in FIG. 4 is a diagram of a system architecture for a computer system 400 with which the invention may be implemented. Consistent with an exemplary embodiment of the present invention, user device 105, application server 110, or database server 115 may comprise, be disposed, or implemented within computer system 400. Although the description may refer to terms commonly used in describing particular computer systems, such as a personal computer, the description and concepts equally apply to other computer systems, such as network computers, workstations, and even mainframe computers having architectures dissimilar to FIG. 4.

Computer system 400 includes a central processing unit (CPU) 405, which may be implemented with a conventional microprocessor, a random access memory (RAM) 410 for temporary storage of information, and a read only memory (ROM) 415 for permanent storage of information. A memory controller 420 controls the RAM 410.

A bus 430 interconnects the components of computer system 400. A bus controller 425 controls the bus 430. An interrupt controller 435 receives and processes various interrupt signals from the system components.

Mass storage may be provided by diskette 442, CD ROM 447, or hard drive 452. Data and software may be exchanged with computer system 400 via removable media such as diskette 442 and CD ROM 447. Diskette 442 inserts into diskette drive 441 which, in turn, connects to bus 430 via a controller 440. Similarly, CD ROM 447 inserts into CD ROM drive 446 which, in turn, connects to bus 430 via controller 445. Hard disk 452 is part of a fixed disk drive 451 that connects to bus 430 by controller 450.

User input to computer system 400 may be provided by a number of devices. For example, a keyboard 456 and mouse 457 connect to bus 430 via controller 455. In addition, other input devices, such as a pen, a tablet, or speech recognition mechanisms, may connect to bus 430 and an appropriate controller and software. A direct memory access (DMA) controller 460 performs direct memory access to RAM 410. User output may be generated by a video controller 465 that controls video display 470.

Computer system 400 also includes a communications adaptor 490 that allows the system to be interconnected to additional computing resources via a local area network (LAN) or a wide area network (WAN), such as the Internet, schematically illustrated by bus 491 and network 120. Signals traveling through network 120 can generally be referred to as "carrier waves" that transport information. Although aspects of the present invention are described as being stored in memory in the form of instructions, those aspects may be stored on other computer-readable media, such as secondary storage devices like hard disks, floppy disks, or CD ROM, or other forms of RAM or ROM, or a carrier wave.

Operation of computer system 400 is generally controlled and coordinated by operating system software. The operating system controls allocation of system resources and performs tasks, such as memory management, process scheduling, networking, and services, among other things.

It will be appreciated that a system in accordance with an embodiment of the invention can be constructed in whole or in part from special purpose hardware or a general purpose computer system, or any combination thereof. Any portion of such a system may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. Other embodiments of the invention will be apparent to those skilled in the art from consideration of the specification and practice of the embodiments disclosed herein. It is intended that the specification and examples be considered as exemplary only, with a true scope of the invention being indicated by the following claims.

What is claimed is:

1. A method for providing a web form, the method comprising:
   receiving web form definition data from a web browser executing on a first computing device, wherein the web form comprises at least one user interface element that allows for customer data entry on a second computing device remote from the first computing device and is encoded at least in part in hypertext markup language (HTML), wherein the web form definition data includes web form component information, web form attributes, and web form layout information;
   transforming, at an application server, the web form definition data into an internal data structure;
   storing the internal data structure in a web form definition data table located at a database server;
   creating a web form input data table corresponding to the web form definition data table;
   caching, at the application server, the internal data structure, wherein the cached internal data structure allows a web browser executing on the second computing device the ability to access a defined web form without the application server having to access the web form definition data table of the database server, and wherein the application server maintains at least some consistency between the web form definition data table and the cached internal data structure after the web form is updated; and
   providing, without the application server having to access the web form definition data table of the database server, the defined web form to a customer for display in a web browser for data entry on a second computing device remote from the first computing device, wherein data entered by the customer on the second computing device is capable of being captured and stored into the web form input data table.

2. The method of claim 1, wherein the web form definition data comprises a web form name.

3. The method of claim 1, wherein the web form definition data defines at least one of a text box and a radio button.

4. The method of claim 1, wherein the web form definition data defines a table structure that has buttons for the customer to add, edit, copy, or delete a row in the table when the web form is presented to the customer for data entry on the second computing device.

5. The method of claim 1, wherein the web form definition data at least defines a binder configured to group a set of web form components to be at least one of hidden and unhidden as a group.

6. The method of claim 1, wherein the web form definition data comprises at least one rule comprising at least one of defining that a field be set as required, a field be set as hidden, a field be set as read-only, and a field be set equal to a calculated value under a condition.

7. The method of claim 1, wherein receiving the web form definition data further comprises receiving the web form definition data over a network.

8. The method of claim 1, wherein creating the web form input data table corresponding to the web form definition data table further comprises generating the web form input data table in a relational database management system.

9. The method of claim 1, wherein the defined web form is displayed to the customer for data entry in a web browser executing on the second computing device and data entered by the customer is captured and stored into a corresponding web form input data table.

10. A system for providing a web form, the system comprising:
    a database server configured to communicate with an application server and store information in a web form definition data table, wherein a web form comprises at least one user interface element that allows for customer data entry and is encoded at least in part in hypertext markup language (HTML);
    a form wizard configured to receive web form definition data from a web browser executing on a first computing device, the web form definition data including web form component information, web form attributes, and web form layout information;
    a web form manager, at the application server, configured to transform the web form definition data into an internal data structure, which is cached at the application server, allowing the web browser executing on a second computing device the ability to access a defined web form without having to access the web form definition data table of the database server;
    a data access object, at the application server, configured to store the internal data structure in the web form definition data table and create a web form input data table in the database server, wherein the web form input data table corresponds to the web form definition data table; and
    a web form data processor configured to provide, without the application server having to access the web form definition data table of the database server, the defined web form to a customer that is displayable for data entry in a web browser executing on the second computing device, wherein data entered by the customer is capable of being captured and stored into the web form input data table, and wherein the application server maintains at least some consistency between the web form definition data table and the defined web form provided by the web form data processor after the web form is updated.

11. The system of claim 10, wherein the web form definition data comprises a web form name.

12. The system of claim 10, wherein the web form definition data defines at least one of a text box and a radio button.

13. The system of claim 10, wherein the web form definition data defines a table structure, the table structure being defined using at least one of an add row button, an edit row button, a copy row button, and a delete row button.

14. The system of claim 10, wherein the web form definition data at least defines a binder configured to group a set of web form components to be at least one of hidden and unhidden as a group.

15. The system of claim 10, wherein the web form definition data comprises at least one rule comprising at least one of defining that a field be set as required, a field be set as hidden, a field be set as read-only, and a field be set equal to a calculated value under a condition.

16. The system of claim 10, wherein the form wizard is further configured to:
provide a web page including at least one web form component, the at least one web form component being user arrangeable on the web page; and
provide the ability to at least one of move, add, and delete the at least one web form component on the web page, the web form definition data defining at least one of the web form component and the location of the web form component on the web page.

17. The system of claim 16, wherein the web page is provided over a network.

18. The system of claim 10, wherein the form wizard is further configured to receive the web form definition data over a network.

19. The system of claim 10, wherein the data access object is further configured to generate the web form input data table in a relational database management system.

20. The system of claim 16, wherein the defined web form is provided to the customer and displayable in a web browser for data entry on the second computing device, and data entered by the customer is captured and stored into a corresponding web form input data table.

21. A computer-readable storage medium on which is stored a set of instructions for providing a web form, which when executed performs steps comprising:

receiving web form definition data from a web browser executing on a first computing device, wherein a web form comprises at least one user interface element that allows for customer data entry on a second computing device remote from the first computing device and is encoded at least in part in hypertext markup language (HTML), wherein the web form definition data includes web form component information, web form attributes, and web form layout information;

transforming, at the application server, the web form definition data into an internal data structure;

storing the internal data structure in a web form definition data table located at a database server;

creating a web form input data table corresponding to the web form definition data table;

caching, at the application server, the internal data structure, wherein the cached internal data structure allows the web browser the ability to access a defined web form without the application server having to access the web form definition data table of the database, and wherein the application server maintains at least some consistency between the web form definition data table and the cached internal data structure after the web form is updated; and providing, without the application server having to access the web form definition data table of the database server, the defined web form to a customer for display in a web browser for data entry on a second computing device remote from the first computing device, wherein data entered by the customer on the second computing device is capable of being captured and stored into the web form input data table.

* * * * *

UNITED STATES PATENT AND TRADEMARK OFFICE
CERTIFICATE OF CORRECTION

PATENT NO. : 8,407,188 B1
APPLICATION NO. : 10/898111
DATED : March 26, 2013
INVENTOR(S) : Tao Yang et al.

It is certified that error appears in the above-identified patent and that said Letters Patent is hereby corrected as shown below:

Title Page, Item [75], should read as follows:

[75] Inventors: Tao Yang, The Colony, TX (US); Amit Singh, Irving, TX (US); Fariborz Ebrahimi, Arlington, VA (US); Edy Setiawan, Irving, TX (US)

Signed and Sealed this
Fourteenth Day of May, 2013

Teresa Stanek Rea
*Acting Director of the United States Patent and Trademark Office*